United States Patent [19]
Elko et al.

[11] Patent Number: 5,450,590
[45] Date of Patent: Sep. 12, 1995

[54] AUTHORIZATION METHOD FOR CONDITIONAL COMMAND EXECUTION

[75] Inventors: David A. Elko, Poughkeepsie; Jeffrey A. Frey, New Paltz; Audrey A. Helffrich, Poughkeepsie; Jeffrey M. Nick, Fishkill; Michael D. Swanson, Poughkeepsie, all of N.Y.

[73] Assignee: International Business Machines Corporation, Armonk, N.Y.

[21] Appl. No.: 408,446

[22] Filed: Mar. 22, 1995

Related U.S. Application Data

[63] Continuation of Ser. No. 21,285, Feb. 22, 1993.

[51] Int. Cl.[6] .......................... G06F 7/04; G06F 12/14
[52] U.S. Cl. .................................... 395/700; 395/650; 395/155
[58] Field of Search ........................................ 395/700

[56] References Cited

U.S. PATENT DOCUMENTS

| | | | |
|---|---|---|---|
| 3,934,131 | 1/1976 | Perschy | 235/153 |
| 4,240,143 | 12/1980 | Besemer et al. | 364/200 |
| 4,525,780 | 6/1985 | Bratt et al. | 364/200 |
| 4,604,694 | 8/1986 | Hough | 364/200 |
| 5,257,384 | 10/1993 | Farrand et al. | 395/725 |
| 5,261,097 | 11/1993 | Saxon | 395/650 |
| 5,283,830 | 2/1994 | Hinsley et al. | 380/25 |
| 5,317,739 | 5/1994 | Elko et al. | 395/650 |

OTHER PUBLICATIONS

Rochkind, Marc J. *Advanced Unix Programming*, 1985, pp. 7–9, 42–53, 92–202.
*Reliable Distributed Shared Memory*, conf. paper by Fleisch, B. D., IEEE Workshop on Experimental Distributed Systems pp. 102–105 (1990).
*Fault Tolerant Distributed Shared Memory Algorithms* by Stumm, Songnian Proceedings of the 2nd IEEE Symposium on Parallel and Distr. Processing (1990).
Error Recovery in Shared Memory Multiprocessors Using Private Caches by Wu, K.-L.; Fuchs, Patel, J. H. IEEE Transactions on Parallel and Distr. Systems vol. 1, Issue 2 pp. 231–240 Apr. 1990.

Primary Examiner—Kevin A. Kriess
Assistant Examiner—St. John Courtenay, III
Attorney, Agent, or Firm—Bernard M. Goldman

[57] ABSTRACT

One or more central processing complexes (CPC's), each with one or more programs being executed, issue commands to a structured electronic storage (SES). The commands include ones that create or delete data structures in SES, and attach or detach users to the data structures. The commands include a comparative authority value operand and a new authority value operand. A data structure or user control information has an associated existing authority value. If the comparative authority value matches the existing authority value, the existing authority value is replaced by the new authority value, and the command is executed. If there is a mismatch, the existing authority value is returned to the program that issued the command, and the command is not executed in SES. This enables software to serialize management of SES and maintain a consistent view of objects in SES in the presence of faulty CPC's, without causing correctly operating CPC's to experience errors or undue delays.

17 Claims, 5 Drawing Sheets

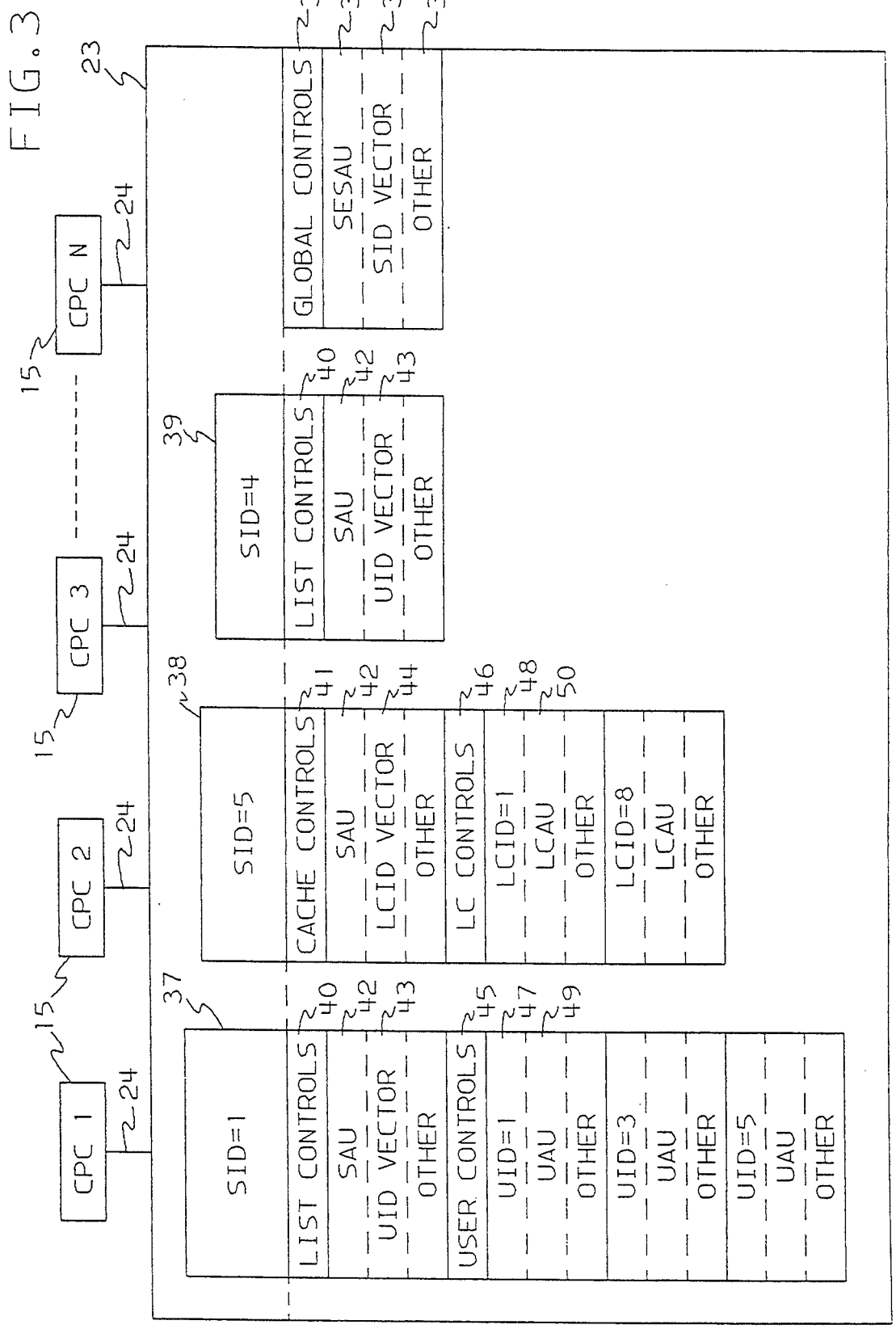

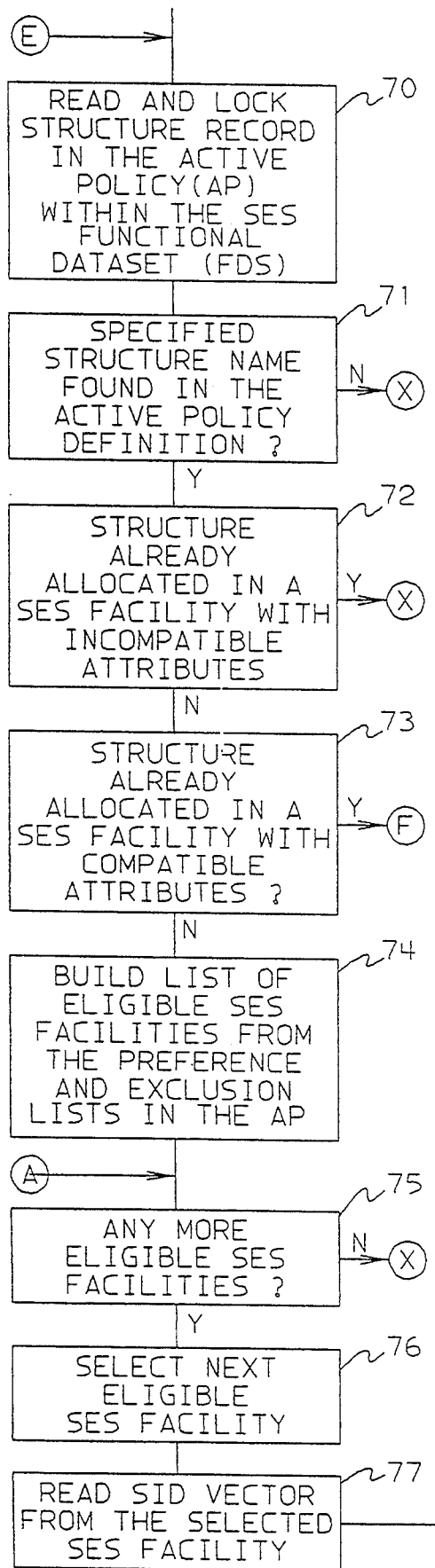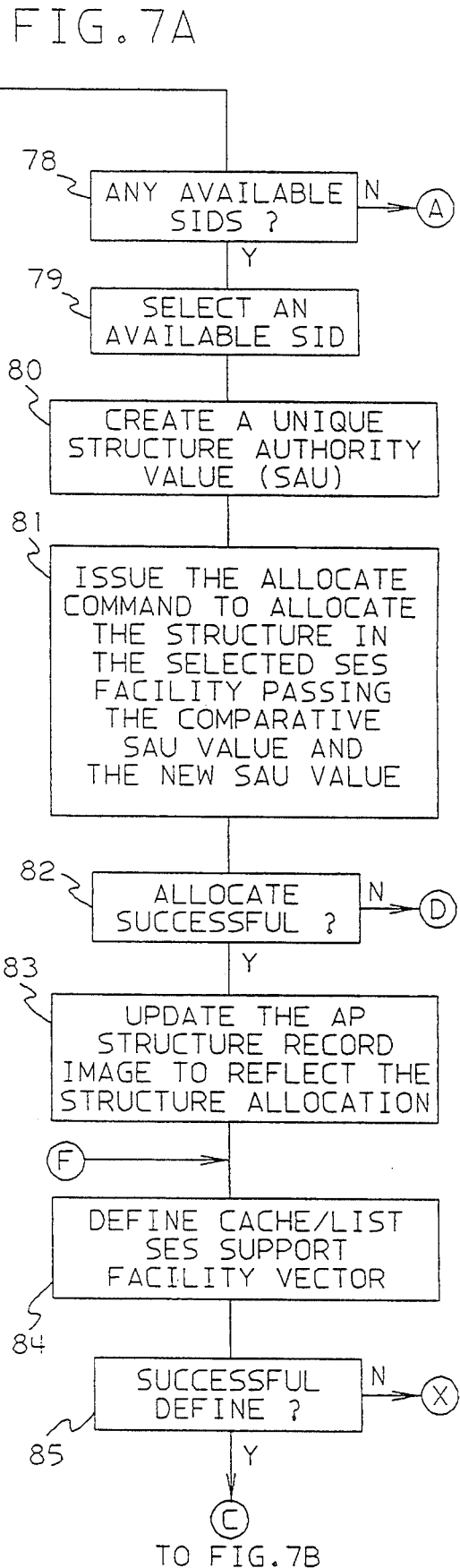
FIG. 7A

AUTHORIZATION METHOD FOR CONDITIONAL COMMAND EXECUTION

CROSS-REFERENCE TO RELATED APPLICATION

This application is a continuation of application Ser. No. 08/021,285, filed Feb. 22, 1993, now abandoned, and the Feb. 22, 1993 date is claimed as the priority date of this continuation application.

FIELD OF THE INVENTION

This invention relates to interconnection of data processing systems through a coupling facility, and more particularly to assigning management ownership of the coupling facility to a collection of systems sharing the facility, and maintaining consistency of data and control structures in the coupling facility when concurrent management of the facility and structures is shared the systems in the presence of faulty systems, and concurrently executing management processes in the systems.

RELATED APPLICATIONS

The following applications, all assigned to the assignee of this application and all filed Mar. 30, 1992, are cited for their description of an environment in which the present invention is embodied.

1. Communicating Messages Between Processors And A Coupling Facility by D. A. Elko et al, Ser. No. 860,380.
2. Method And Apparatus For Notification Of State Transitions For Shared Lists Of Data Entries by J. A. Frey et al, Ser. No. 860,809, now U.S. Pat. No. 5,390,328.
3. Sysplex Shared Data Coherency Method and Means by D. A. Elko et al, Ser. No. 860,805.
4. Command Quiesce Function by D. A. Elko et al, Ser. No. 860,330, now U.S. Pat. No. 5,339,405.
5. Command Retry System by D. A. Elko et al, Ser. No. 860,378, now U.S. Pat. No. 5,342,397.
6. Lock Control System for Data Sharing in a Multi-system Data Processing Complex by J. Insalaco et al, Ser. No. 548,516 (Filed Jul. 2, 1990).

BACKGROUND OF THE INVENTION

In a data processing system, data and system control structures may be shared between several programs running on a single central processing complex (CPC), or shared between several CPC's using a shared facility.

Commands are communicated over a link to the shared facility through channel apparatus. (See related application 1.) The shared facility provides a program controlled command execution processor which accesses the shared control and data structures. The shared storage is comprised of system storage for system-wide or global control structures, and storage for CPC-program created data cache and list structures. (See related applications 2 and 3). All of these structures can be shared among programs in one CPC, or among plural CPC's. Commands are received over a plurality of links. Link buffers are provided to receive commands and/or data, and store responses for transfer over the link to a CPC and/or program. When the shared facility interconnects a plurality of CPC's, a system complex (Sysplex) is created to form a single system image from all of the autonomous CPC's.

It is therefore very important that a function and system be provided in the shared facility that maintains consistency of data or control structures. A program that initiates an action in the shared facility must be able to determine whether a command was received, received and completed, or received but aborted. The program must eventually receive the results of the action, or determine that the action must be requested again. (See related applications 4 and 5).

The related applications describe a shared coupling facility in the form of a structured electronic storage (SES) which couples a network of CPC's into a Sysplex. The CPC's share data structures in SES in the form of caches and lists, and can share management of the status of SES.

The status of a structure in SES is maintained by all the CPC's attached to the SES. When a structure is allocated or created in SES, the allocation status is made known to all systems in order to insure that all users of a given structure share the same instance of that structure. Structures may be allocated and deallocated and users of those structures may be attached and detached concurrently by any CPC during ongoing operation of the systems attached to the SES.

When a user of a SES structure is being detached or a structure is being deallocated, the system on which that operation is being executed may fail. The failure may be permanent or temporary. In either case, a latent SES operation may exist to detach a user or deallocate a SES structure. Until the detach or deallocate operation has completed, SES resources are not available for reassignment. In order to avoid having the failure of one system adversely impact the capabilities of other systems, other systems require the ability to complete the detach or deallocate operation.

The ability of a correctly operating system to complete the detach or deallocate operation associated with a failing system makes SES resources available for reassignment but leads to a serialization and data integrity problem. Assume a system "A" was processing a deallocate command when it became temporarily not operational. Following system A's failure, assume a system "B" completed the deallocate processing and subsequently allocated a new structure in the SES facility with the same identification as the structure that system A was deallocating before it failed. This new structure is available to service users and contain nonvolatile data. If system A resumes execution, the latent deallocate command must not be successfully processed against this new structure created by system B.

SUMMARY OF THE INVENTION

An object of the present invention is to preserve consistency of control and data structures in a facility shared by a plurality of programs when any of the programs can change the status of structures or users in the facility.

A more specific object of the invention is to provide an authorization method as part of the execution of certain commands to the facility to conditionally execute the command only if the authorization method allows the execution.

These and other objects, features, and advantages of the invention are achieved by associating an authority value with objects in the shared SES facility. Objects include control and status information of SES itself, data structures including cache and list structures, and user control information.

Certain commands issued to SES which change the status of objects include a comparative authority value operand. The comparative authority value is compared with the existing authority value associated with the object. If they do not match, the command is not executed, and the existing authority value is returned to the program issuing the command.

The commands also include a new authority value operand. If the comparative authority value and existing authority value are equal, the command is executed and the new authority value replaces the previous existing authority value. Authority values are comprised of information that is unique to each command issued by any program connected to SES.

In the example previously described, system A might start a deallocate procedure because the authority values matched. However, when system B completed the deallocate, and allocated a new structure, a new existing authority value would have been associated with the structure. A second attempt by system A to deallocate the structure would not succeed because the comparative authority value in the command would not match the existing authority value created by system B.

BRIEF DESCRIPTION OF THE DRAWINGS

FIG. 3 shows the association of data structure and user ID's with authority values within a SES facility.

FIGS. 7A–7B depict is a flow chart describing the method of using authority values in accordance with the present invention to assure consistency of data and controls under concurrent control of a plurality of users.

DESCRIPTION OF THE PREFERRED EMBODIMENT

Figure 1:
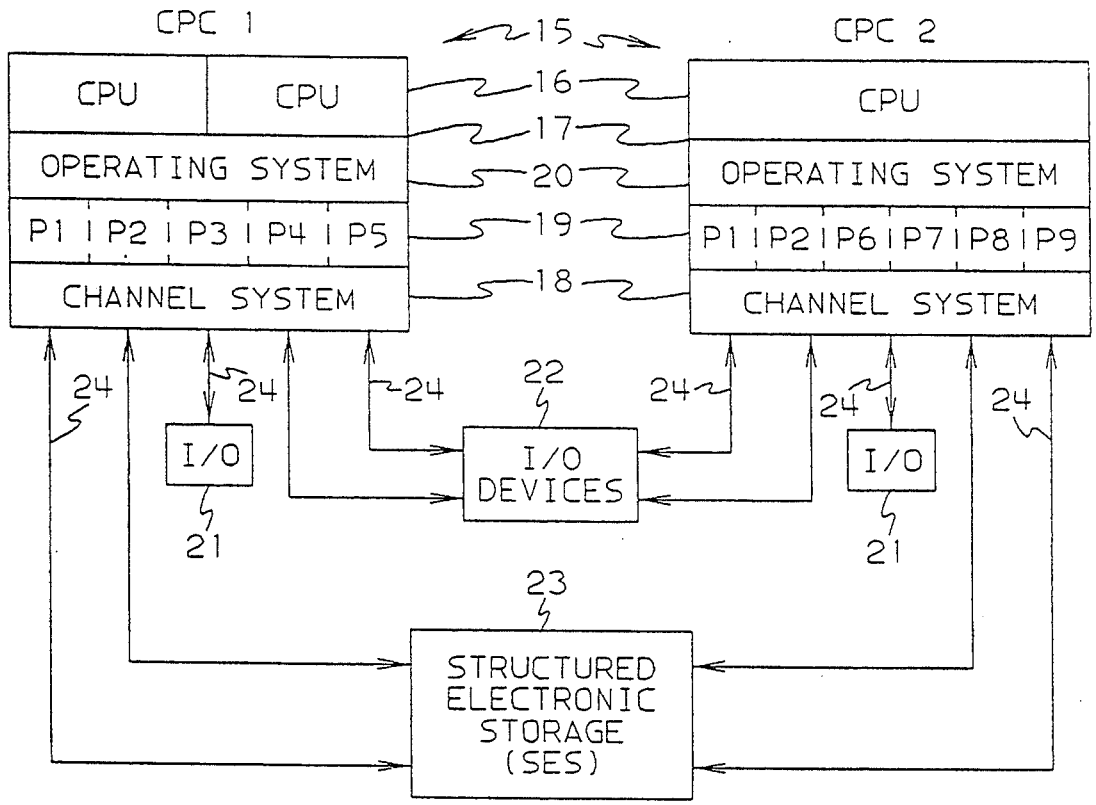
FIG. 1 is a block diagram of a data processing system complex that incorporates the present invention to provide shared usage of system-wide data and control structures in a shared structured electronic storage (SES) facility.

The block diagram of FIG. 1 provides a description of the environment for practicing the present invention. It depicts the coupling together of at least two autonomous data processing systems into a system complex (Sysplex) that exhibits a single system image to a user. Autonomous data processing systems 15 are designated as Central Processing Complex (CPC) 1 and 2. CPC 1 and 2 can each be an International Business Machines ES/9000 data processing system.

An ES/9000 data processing system 15 is comprised of one or more Central Processing Units (CPU) 16, a main memory 17 and a channel system 18. Main memory 17 stores data which is manipulated by a plurality of stored application or utility programs 19 (P1-P9), all under the control of an operating system 20 such as the IBM MVS/SP control program, including SES support programming and Sysplex management to be further described. In a Sysplex environment, where fault tolerance and/or increased performance is desired, some of the programs 19 such as P1 and P2 may be duplicated in the systems 15.

The channel system 18 is comprised of a plurality of channel sub-systems (CSS) which connect each system 15 with various peripheral units. Certain of the peripheral units may be various I/O units 21 such as magnetic tapes, printers, direct access storage devices (DASD), or communication control units to provide connection of user terminals for example. Some I/O devices 22 may be shared by the two systems 15. The channel systems 18 are also shown in FIG. 1 to be connected to a Structured Electronic Storage 23 (SES) to be more fully described as part of the preferred embodiment of the present invention.

The paths 24 in FIG. 1 that connect the systems 15 to the various peripheral units are preferably fiber optic cable pairs that provide for serial, bidirectional transfer of information between the units. Commonly assigned U.S. Pat. Nos. 5,003,558 and 5,025,458 are incorporated by reference herein for their showing of various aspects of a CSS for synchronizing and decoding of serial data transmission between the systems 15 and, for example SES 23.

SES 23 is typically used to store and manipulate various data structures such as lists and caches. The above cited references 2 and 3 deal with the structure and manipulation of these data structures. The present invention describes the process by which these data structures are allocated or activated, deallocated or deactivated, and the attachment or detachment of users (programs) to the structures for shared use.

Support programming, as part of the operating systems 20, respond to requests from programs 19 to access control information contained in SES 23, and control information contained in a SES function data set (FDS) stored on one or more of the shared I/O devices 22. The FDS stores information about various data structures such as size and type, users of the structures, names used by various programs to identify the structures, and other installation dependent information about the various resources in the systems coupled together in a sysplex. Although only a single SES 23 is described, there could be several SES's coupling various combinations of CPC's together. Only one sysplex is described here, but even with only one SES 23, various combinations of CPC's can be defined. The FDS on I/O devices 22 would be accessed and manipulated in accordance with the above cited reference 6.

Figure 2:
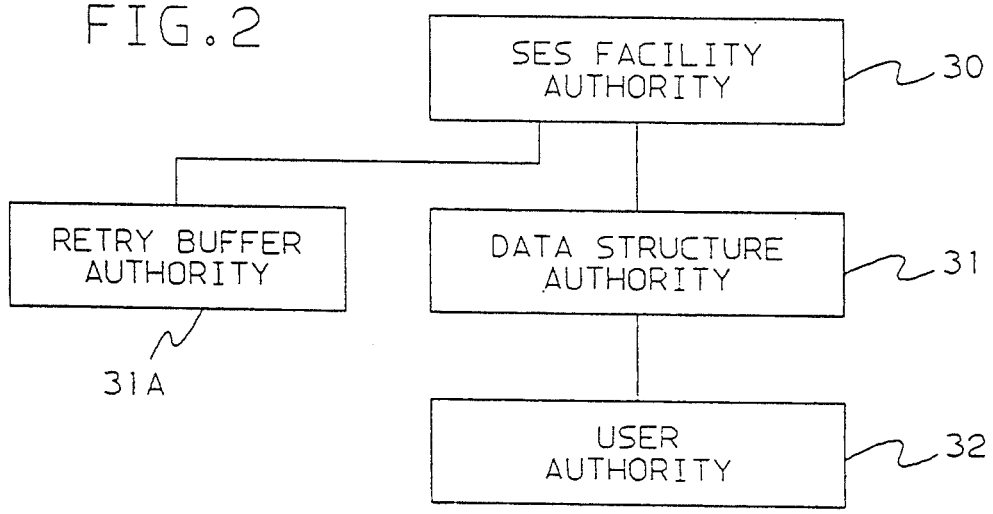
FIG. 2 is a block diagram depicting the hierarchy of authorization achieved in practicing the present invention.

FIG. 2 depicts the general concept of the present invention. To allow for the concurrent management of SES 23, data structure allocation/deallocation, and user attachment/detachment, an authorization process is implemented. A series of authorization checks take place including a first check that the SES facility itself is in a state to be managed. This is effected by the associated SES facility authority 30. Data structure authority 31 deals with allocation/deallocation of data structures, and user authority 32 deals with attachment of users to the various data structures. The same authority concept is used in the creation or deletion of retry buffers 31a as described in above cited reference 5.

An associated authority value of zero signifies that SES is not managed, and therefore can not respond to most commands received. An authority value of zero associated with a data structure indicates that the data structure has not been allocated, and a zero authority value associated with a user indicates that the designated user has not yet been attached to a data structure. A nonzero authority value associated with these three objects means just the opposite. The following discussion will describe the format of authority values, and how they are used in various commands to allow for concurrent manipulation of the data structures to maintain consistent views of the structures with possible error conditions experienced by various users of SES. This need is evident from the description of reference 6 cited above where it is seen that one user may initiate an action in SES with one view of an object status, but find subsequently that the status has changed.

CPC's 15, SES 23, and links 24 of FIG. 1 are shown again in FIG. 3. The only structure of SES 23 to be discussed in this invention is that portion that actually stores operands, control data, and data structures. The above cited references 4 and 5 discuss additional detail involving program controlled processors and stored programs in SES 23 that respond to and executed various commands issued to SES 23 by SES support programs running in the CPC's 15 as part of the operating system 20.

FIG. 3 shows a number of operands stored in SES 23, and which form part of commands issued to SES by programs running in the CPC's 15. General control of the SES facility is by global controls 33 which include a SES authority value 34 (SESAU), structure ID (SID) vector 35, and other control information 36. Details of the format and use of these operands will be discussed subsequently.

A number of data structures 37, 38, and 39 will be defined, and as previously mentioned, these data structures may be list structures or cache structures. List structures might typically be elements of work queues being shared by the various CPC's. Cache structures become a part of a storage hierarchy, shared by CPC's each with local caches and main memory, as well as other attached I/O devices.

List structure controls 40 in the case of list structures, and cache structure controls 41 in the case of cache structures include a structure authority (SAU) operand 42. Each list structure control 40 also includes an associated user ID (UID) vector 43, and each cache structure control includes an associated local cache ID (LCID) vector 44.

As data structures become allocated or created, users or local CPC caches will be attached to the structures for use. As this occurs, user controls 45 and local cache (LC) controls 46 are made effective. The user or local cache controls will include a user ID (UID) operand 47 or local cache ID (LCID) operand 48. Each UID 47 and LCID 48 will have an associated user authority (UAU) value 49, and local cache authority (LCAU) value 50 respectively.

Figure 4A:
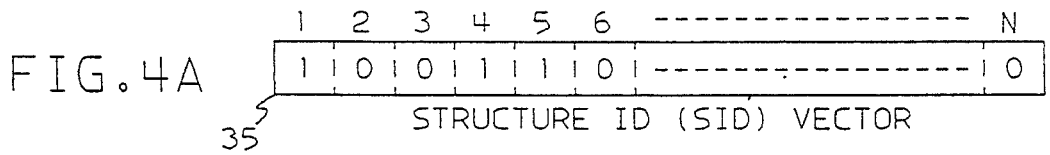
FIGS. 4A–4B depict the format and contents of bit vectors used for defining data structure ID's and user ID's in a SES facility.
Figure 4B:
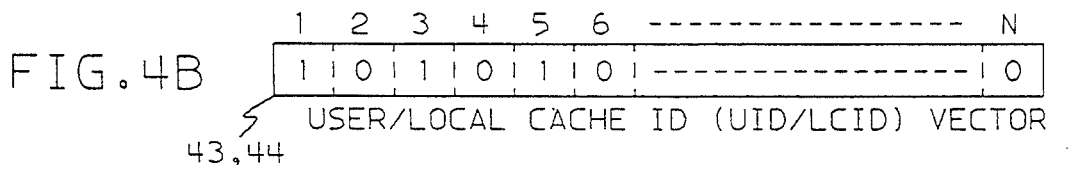

FIG. 4A and FIG. 4B show the format of the SID vector 35 and UID/LCID vectors 43,44 respectively in FIG. 3. Each is a bit vector where the binary state of each bit position indicates whether a particular ID value has been assigned. The allocation or creation of a data structure starts with a CPC program identifying the structure by a logical name within the particular CPC. For purposes of identifying the structure in commands issued to SES, the structure is dynamically given a temporary ID. The SID vector 35 is examined, the first position having a binary "0" is noted, and the position number used to create a 16-bit SID value. Commands to be executed on that data structure thereafter use the SID as an operand.

In a like manner, each data structure has an associated UID or LCID bit vector shown in FIG. 4B. As users or local CPC caches are attached for use of the structures, the associated UID or LCID vector is examined to find a bit position with binary "0", and that position is used to create an 8-bit binary number to identify that particular user or local cache.

In the case of a SID, UID, or LCID vector, when the position is assigned, it is changed to a binary "1". In a like manner, when a user or local cache is detached, or structure deallocated, the corresponding bit position of the bit vector is reset to binary "0" meaning that ID is again available for use for some other data structure, user, or local cache.

Figure 5A:
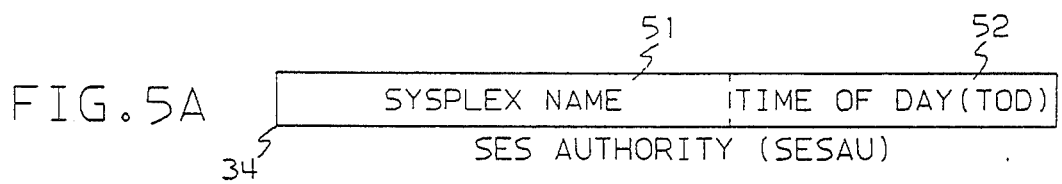
FIGS. 5A–5C depict the format of authority value operands used in commands to SES and stored in SES.
Figure 5B:
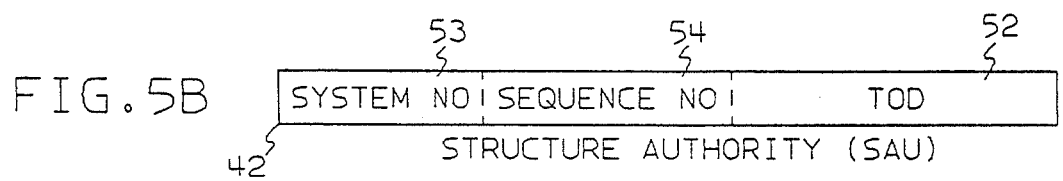
Figure 5C:
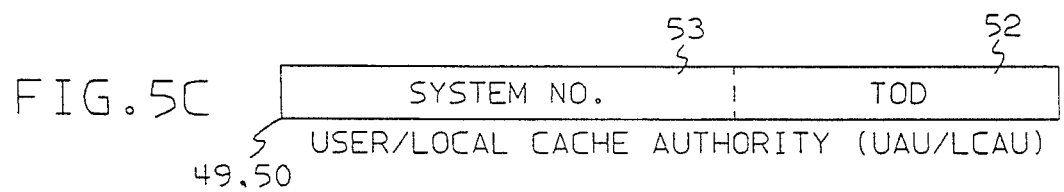

FIGS. 5A, 5B, and 5C show respectively from FIG. 3, SESAU 34, SAU 42, and UAU 49 or LCAU 50. An essential in practicing the present invention is that authority values, when created, be unique. In a preferred embodiment of the present invention, the SESAU is comprised of an 8-byte sysplex name 51, and an 8-byte time-of-day (TOD) clock value 52. The TOD of all CPC's 15 are synchronized and represents the instant in time that the authority value was created. The TOD of all systems are synchronized to an external time reference in accordance with the teaching of U.S. Pat. No. 5,041,798 for Time Reference With Proportional Steering by Moorman et al, and assigned to the assignee of this invention. As mentioned previously, a SES 23 can be connected to many CPC's, and various combinations of CPC's can each be considered a sysplex. The sysplex name 51 and TOD 52 reflect which gained management control of the SES facility.

A structure authority (SAU) value 42 shown in FIG. 5B is comprised of a TOD value 52, a system number 53, and a sequence number 54. The system number 53 is a 1-byte value assigned by sysplex management logic when the system joined the sysplex. The sequence number 54 is a 3-byte value reflecting the number of times the system number has been assigned.

A user or local cache authority value 49 or 50 is shown in FIG. 5C and is comprised of the above mentioned system number 53 and TOD value 52. Again, the TOD value 52 reflects the instant in time that the UAU or LCAU is created as part of attaching a user or local cache to a particular list or cache structure.

Subsequent descriptions will refer to the various authority values of FIG. 5 with modifiers. A first authority value modifier will be a "comparative" authority value which will be one operand contained in certain commands issued to SES 23 by a CPC 15. Another operand that may be included in a command is a "new" authority value. Finally, an authority operand stored in SES as either SESAU 34, SAU 42, or UAU/LCAU 49 or 50, will be referred to as an "existing" authority value.

Figure 6A:
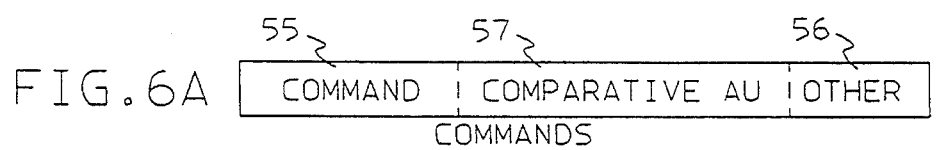
FIGS. 6A–6D depict the format of commands issued to SES by a program and the response received back to the program from SES.

FIG. 6A will be used to describe the general use of authority values in accordance with the present invention. A command issued by a CPC 15 to be executed on an object in SES 23 will include a command code 55 designating the action to be performed on a particular object in SES. Other operands 56 in the command may designate the object and any other operands necessary during the execution. The significant operand of the command in accordance with the invention is the comparative authority value (COMP AU) 57. In particular, the execution of the command on the object by the processor and programming in SES will be inhibited if the comparative authority value 57 does not equal the existing authority value associated with the object.

Figure 6B:
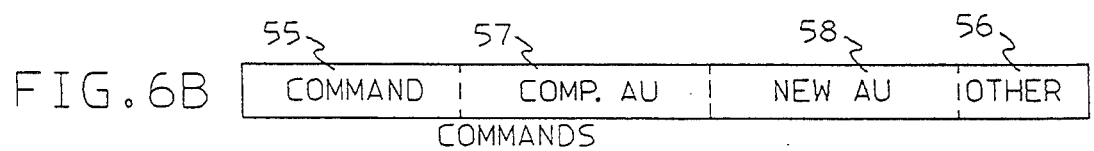

The command in FIG. 6B adds a further operand comprising a new authority value 58. Certain commands, when executed by SES, make a comparison of the comparative AU 57 to the existing authority value of an object in SES. If they are equal, the new authority value 58 becomes the existing authority value of the object.

An example of this latter use of authority values is one of the first commands issued to SES by a CPC. When the shared facility is initialized, SES is in an unmanaged state such that only a limited number of commands will be executed. The unmanaged state is signified by the fact that the SESAU 34 in FIG. 3 has a value of zero. To place SES in a managed state, and therefore responsive to further commands, a command "Set SES authority" is issued. The comparative authority value 57 will be zero, and the new authority value 58 will be a non-zero value with the contents as shown in FIG. 5A for SESAU 34. This now becomes the existing authority value for the SES facility itself. To place SES in an unmanaged state, the Set SES Authority command will have a new SESAU value 58 of zero. On the assumption the comparative authority value 57 still equals the existing authority value of SESAU 34 previously set, the new value of zero will be set in SESAU 34.

The same concept applies to allocation or creation of data structures, the attachment of users to list structures, and attachment of local caches to cache structures in SES. A data structure such as list 37 or cache 38 in FIG. 3 is not allocated until an allocate command is issued by a CPC with a comparative SAU value 57 of zero, and a new SAU value 58 as in FIG. 5B. The SAU 42 of FIG. 3, for example, will be set with the new SAU value 58 of the command. A user may not use a data structure until the same procedure is executed with an Attach command specifying a structure such as SID 1 which will change the user authority (UAU) 49 from zero to a nonzero value such as shown in FIG. 5C. A detach command or deallocate command must include a proper comparative authority value 57 equalling the existing authority value of UAU 49 or SAU 42 respectively. The new authority value 58 of the commands will equal zero and become the existing authority value UAU 49 or SAU 42 respectively.

Figure 6C:
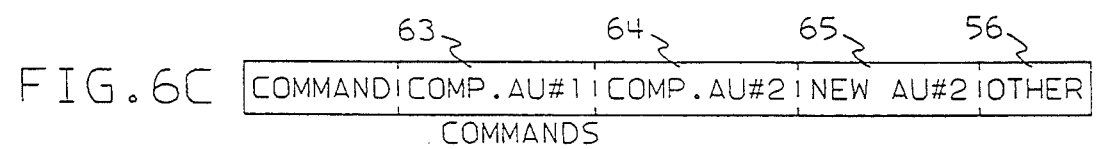
Figure 6D:
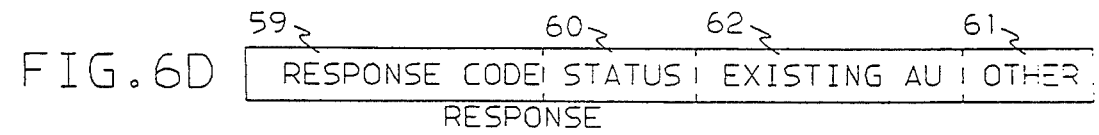

Commands such as those just described, issued by a CPC 15, expect a response back from SES 23 such as shown in FIG. 6D. The response code 59, status 60, and other 61 operands received reflect the results of execution of the command received by SES 23. If the comparative authority value 57 of a command did not equal the existing authority value associated with the object of the command, this will be reflected in the contents of the response code 59 and status 60. A further operand in the response will be the correct existing authority value 62 associated with the object, whether SES itself, a data structure, or user. Some commands to SES allow for the reading of global, structure or user controls including the existing authority value. The present invention as just described allows a program in a CPC to assume that the allocate, deallocate, attach, or detach command will complete execution with the correct comparative authority value specified. In those few instances where the comparative authority value does not equal the present existing authority value, the correct existing authority value 62 in the response will allow for program protocols which determine the correct action to take. Correct actions may include discontinued use of SES, terminate, or use of the correct value in a subsequent command by another system completing detachment of a user initiated by a system that is now stopped.

The invention described can be extended further as shown in FIG. 6C. A command would include a comparative authority value #1 63, comparative authority value #2 64, and a new authority value #2 65. For example, execution of this command would require comparative authority value #1 to equal the existing SAU 42 in FIG. 3. Comparative authority value #2 would have to equal the existing UAU 49 before a user is attached to the list structure changing the UAU 49 from zero to the value of the new authority value #2 65 in the command.

Figure 7B:
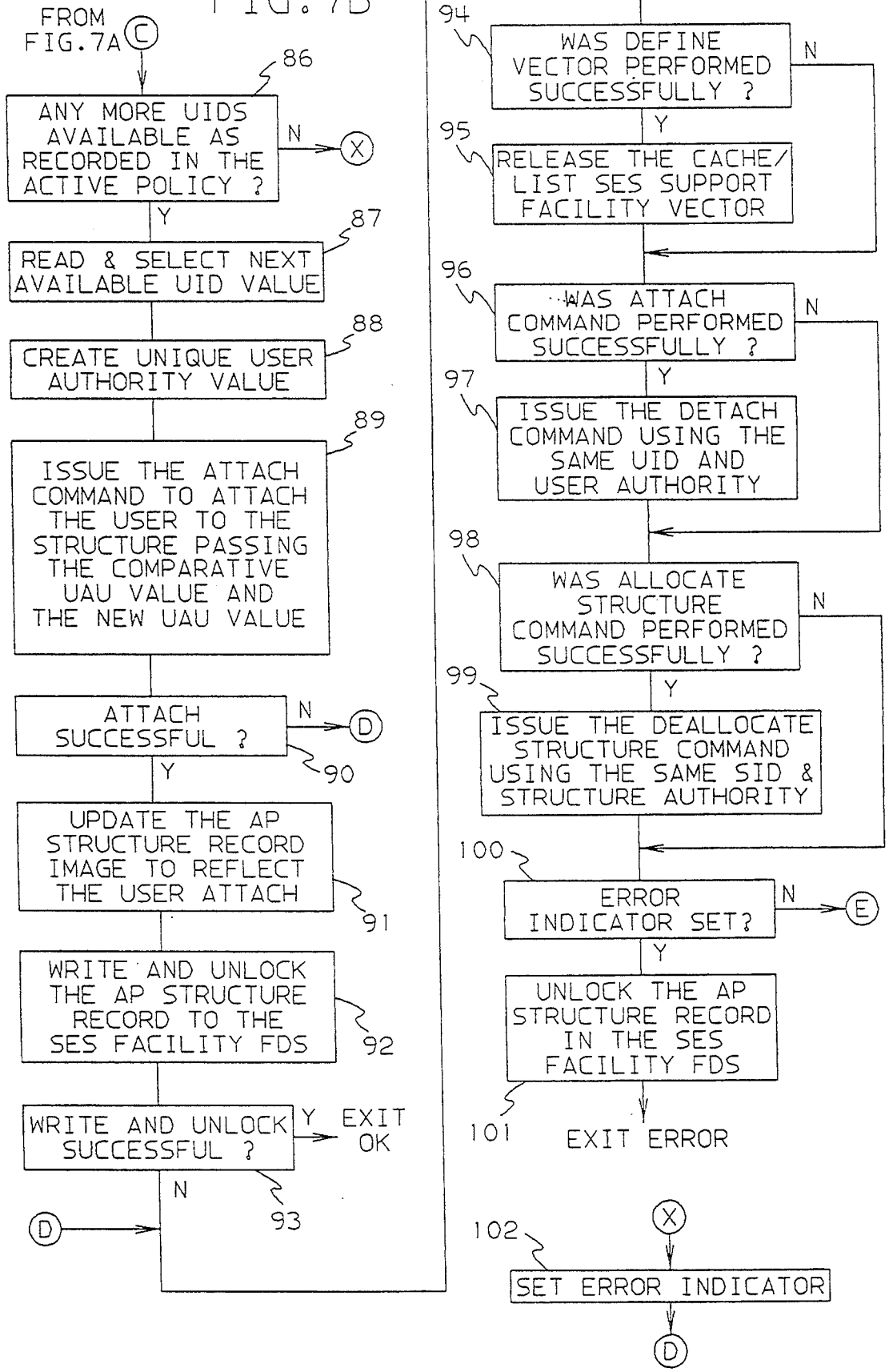

The flow chart of FIG. 7 shows steps taken by SES support programming of an operating system 20 of a CPC 15 in FIG. 1 when a program 19 requests connection of a user to a data structure in SES 23. The request will provide a logical name for the data structure.

Beginning at 70, the operating system 20 will utilize the techniques disclosed in the above cited reference 6 to read and lock the SES functional dataset (FDS) from a shared I/O device 22. The FDS contains the installation specified active policy (AP) and SES status information for the sysplex. In certain error situations, the lock may be stolen by another system in the sysplex. After proceeding in accordance with the present invention by processing in the memory of a CPC, the update of the FDS record which occurs later must verify the lock is still held by this CPC.

Steps 70 through 76 proceed as described to determine if the requested structure, with proper attributes exists in any SES to which the CPC is connected. If at step 73 it has been determined that the requested data structure has been allocated in a SES, step 84 is executed to begin the attachment of the requester as a user to the structure. Several steps include an exit to step 102 to commence more extensive processing to recover from undesirable conditions in the sysplex. After setting the error indicator at 102, the dataflow is entered at step 94, completing at step 101 where the FDS structure will be unlocked on the shared I/O devices 22 of FIG. 1.

Step 77 begins the practice of the present invention. Steps 77 through 79 effect the reading of the SID vector 35 from the global controls 33 of SES 23. The bit positions shown in FIG. 4A are examined and the first binary "0" selected to create the 2-byte SID.

Step 80 causes SAU, with the format of FIG. 5B to be created. The allocate command is issued to SES at step 81 to allocate the structure in the selected SES facility. Operands in the command consist of a comparative SAU value (57 in FIG. 6B), a new SAU value (58 in FIG. 6B) created in step 80, and the SID value selected in step 79.

When SES and/or a sysplex is initialized, the first order of business is to place SES in a managed state by changing the existing SESAU 34 from zero to a nonzero value including the name of a sysplex and TOD value as shown in FIG. 5A. This process may be a race between systems in a sysplex or, in the case of several sysplexes attached to one SES, between the sysplexes. At some point in time, a system will find that the global SESAU recorded in the AP on DASD 22, the existing SESAU 34 in SES 23, and the comparative authority value 57 of a Set SES Authority command are all zero. The new authority value of the command, including the sysplex name and TOD, will be stored as the existing SESAU 34 in SES 23 and the global SESAU recorded in the AP on DASD 22.

As this process proceeds concurrently in one or more other systems and/or sysplexes, and because another system may steal the lock on the AP in accordance with reference 7, various states of SES may be observed from examining the global SESAU in the AP and the existing SESAU recorded in SES. A system may find that SES is already managed by a system in the same sysplex in which case SES is made available to that system as well. It might be found that another sysplex is managing SES in which case SES is made unavailable to the system. It can also be determined that although another sysplex is managing SES, it has failed in some way. In this case recovery procedures can be initiated to place SES in an unmanaged state including freeing global resources in SES. After placing SES in an unmanaged state, SES is again available for being placed in a managed state by any sysplex that gains ownership by the process described.

When SES is placed in the managed state, and a user requests attachment to a data structure, steps 70 through 76 proceed as described to determine if the requested structure, with proper attributes exists in any SES to which the CPC is connected. If at step 73 it has been determined that the requested data structure has been allocated in a SES, step 84 is executed to begin the attachment of the requester as a user to the structure. Several steps include an exit to step 102 to commence more extensive processing to recover from undesirable conditions in the sysplex. After setting the error indicator at 102, the dataflow is entered at step 94, completing at step 101 where the FDS structure will be unlocked on the shared I/O devices 22 of FIG. 1.

Step 77 begins the practice of the present invention. Steps 77 through 79 effect the reading of the SID vector 35 from the global controls 33 of SES 23. The bit positions shown in FIG. 4A are examined and the first binary "0" selected to create the 2-byte SID.

Step 80 causes SAU, with the format of FIG. 5B to be created. The allocate command is issued to SES at step 81 to allocate the structure in the selected SES facility. Operands in the command consist of a comparative SAU value (57 in FIG. 6B), a new SAU value (58 in FIG. 6B) created in step 80, and the SID value selected in step 79.

There are two reasons the allocate would not be successful at step 82. First, the comparative SAU in the command does not equal the existing SAU 42 associated with the structure identified by the SID. Second, at the time the bit position identified by the SID is to be changed in the SID vector 35 from binary 0 to binary 1, it is found to already be binary 1. Each of these cases indicate that the lock on the AP in the FDS on the shared I/O devices 22 had been stolen by another system and the state of resources within the SES facility already changed.

Entering the dataflow at step 94 from step 82 would cause the processing at step 100 to reenter the dataflow at step 70 to initiate another attempt at processing the original request.

At step 83 the image of the AP in memory of the CPC processing the request will be updated to show the allocation. The image will be used later to update the FDS on the shared I/O with lock verification. This has the effect of making the entire process of FIG. 7 appear to be atomic in the CPC 15 initiating the process. As long as all of the steps execute properly using the AP image in the CPC 15, the CPC assumes no other system has accessed the AP and all CPC's in the sysplex are using the same instance of all structues. At the completion of processing FIG. 7, the CPC while attempting to finally update the AP with new global values may find the lock had been stolen in accordance with reference 7 and have to reinitiate processing of the original user request.

Steps 84 through 86 are executed internally by the CPC to update various internal control operands, and make one check of the active policy as retrieved from the shared I/O for available UID's.

The UID/LCID vector (43 for a list structure or 44 for a cache structure shown at FIG. 4B), and associated with the structure with a SID selected at 79 is retrieved from SES at step 87. The first position of the UID/LCID vector with a binary 0 is selected to create a 1-byte UID/LCID value.

Step 88 creates a UAU 49 for a list user, or a LCAU 50 for a local cache as shown at FIG. 5C. An attach command is issued to SES to effect connection for use of the structure allocated. Operands of the command include the SID selected at 79, UID/LCID selected at 87, a comparative UAU/LCAU value of zero, and the UAU/LCAU created at 88. As with the allocate procedure at step 82, step 90 may find that the authority value compare did not succeed, or the UID bit position in the UID vector had already been changed to binary 1, again indicating the lock on the FDS had been stolen and changes already made to the user or local cache controls 45 or 46 respectively.

If the attach was not successful, the flow chart will be entered at step 94. This time step 95 must be performed to undo the effects of step 85, and step 99 must be performed to undo the effects of the allocate at step 81. The deallocate command is issued to delete the named structure. The command operands include the SID from step 79, a new SAU of zero, and a comparative SAU value equal to that created at step 80 which is now the existing SAU associated with the SID allocated. The bit position of the SID vector equal to the SID selected will be reset to binary 0. As before, the error indicator would not have been set at 102, so the entire process can be reinitiated for the same request.

If the attach was successful, steps 91 and 92 update the AP in the CPC and then write the update back to the shared I/O devices 22 and unlock the FDS for further use by other systems. If the write-back is successful at 93 control is returned to the program that requested the allocation. The write-back may not be successful because the serialization on the FDS has been stolen in accordance with reference 7, or another error has occurred. In this case all of steps 94 through 99 must be processed to undo the previous allocation and attachment. As before, the entire process can then be reinitiated.

The combined use of the present invention with conditional execution of commands using authority values and the concepts of reference 7 allow for efficient concurrent management of the shared coupling facility. Any system in a sysplex can examine the contents of the AP in the FDS, including authority values, and the authority values stored in SES 23 to determine that a system executing the process of FIG. 7 has failed. The second system can then enter the process of FIG. 7 to complete the failed process to free resources of SES for further use. An attempt by the failed system to re-execute a latent command will find new authority values and determine there is a new instance of the data structure unrelated to the previously failed command execution.

There has thus been shown a method using authority values that permits the concurrent management of control and data structures by a plurality of users. All users can proceed with the management processing independently on the assumption that each has a consistent and updated version of the information in a shared coupling facility. The authorization method detects inconsistencies at the time of command execution to inhibit command action only if another user has changed the previous view of data by the user issuing the command.

Having thus described our invention, what we claim as new and desire to secure by Letters Patent is:

1. A method of concurrent management of a facility shared by a plurality of data processing systems, including the management of a plurality of facility objects, comprising the steps of:
  A. Accessing by any data processing system stored global values reflecting the status of facility objects including a global authority value:
  issuing a command to the facility by a user by any data processing system (system), the command to be executed by the facility on a facility object, and including an operand specifying a comparative global authority value;
    A1. Specifying a further operand in the command comprising a new global authority value,
  B. Inhibiting execution of the command by the facility if the comparative global authority value is not equal to an existing global authority value stored for the facility object:
    B1. Replacing the existing global authority value stored for the facility object with a new global authority value in the operand of the command to prevent a revived failed command from being able to access the facility object with the comparative global authority value used by the revived failed command and to serialize concurrent commands for the facility object by preventing more than one concurrent command from getting a compare-equal on the existing global authority value before completion of execution of the one concurrent command, and
  C. executing other commands issued by any system when any other command provides a comparative global authority value that equals the existing global authority value currently stored for the facility object.

2. The method in accordance with claim 1 comprising the further step:
  D. Returning to the user the existing global authority value if the comparative global authority value is not equal to the existing global authority value.

3. The method in accordance with claim 2 wherein: Step B further includes the step:
  B2. Replacing the global authority value stored for the facility object in the stored global values with the new global authority value.

4. The method in accordance with claim 1 wherein in Step B1:
said comparative global authority value and said existing global authority value equal zero, and said new global authority value has a nonzero value.

5. The method in accordance with claim 4 wherein: said facility object is facility status and control information.

6. The method in accordance with claim 5 wherein: execution of the command places said facility in a managed state.

7. The method in accordance with claim 4 wherein: said facility object is a data structure.

8. The method in accordance with claim 7 wherein: said command execution creates or allocates said data structure for use in said facility.

9. The method in accordance with claim 8 wherein: said data structure is a list structure.

10. The method in accordance with claim 8 wherein: said data structure is a cache structure created as part of a storage hierarchy.

11. The method in accordance with claim 4 wherein: said facility object is user data.

12. The method in accordance with claim 11 wherein: Step A further includes the step;
  A2. Specifying other operands in said command comprising a data structure identification and user identification, and
  said command execution attaches an identified user to an identified data structure for further use of the identified data structure.

13. The method in accordance with claim 4 wherein: Step A further includes the step;
  A2. Specifying another operand in said command comprising a user identification, and
  said command execution detaches, or deactivates, the identified user from further use of the facility object.

14. The method in accordance with claim 13 wherein: Step A further includes the step:
  A2. Specifying another operand in said command comprising a facility object identification, and
  said command execution deletes, or deallocates, the identified facility object from the facility.

15. The method in accordance with claim 13 wherein: execution of said command places the facility in an unmanaged state.

16. The method in accordance with claim 15 wherein: execution of said command releases facility resources for future use after the facility is again placed in a managed state.

17. The method in accordance with claim 1 wherein: Step A further modifies the following step;
  A1. Specifying a further operand in the command comprising a new global authority value for the facility object, and specifying another operand in the command comprising another comparative global authority value for another facility object; and
Step B further modifies the following step;
  B1. Replacing the existing global authority value stored for the facility object with the new global authority value operand in the command and execute the command when the comparative global authority value equals the existing global authority value of the object, and said another comparative global authority value equals the existing global authority value of said another facility object.

* * * * *